United States Patent
Shah et al.

(10) Patent No.: US 11,650,831 B2
(45) Date of Patent: May 16, 2023

(54) ENHANCEMENT OF APPLICATION SERVICE ENGAGEMENT BASED ON USER BEHAVIOR

(71) Applicant: Salesforce, Inc., San Francisco, CA (US)

(72) Inventors: Anal Shah, Fremont, CA (US); Sankara Jaya Prakash Nimmagadda, San Francisco, CA (US); Tiffany Tso, San Francisco, CA (US); Peter Chung, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 111 days.

(21) Appl. No.: 16/863,784

(22) Filed: Apr. 30, 2020

(65) Prior Publication Data

US 2021/0342164 A1 Nov. 4, 2021

(51) Int. Cl.
*G06F 7/38* (2006.01)
*G06F 9/445* (2018.01)
*G06F 9/54* (2006.01)

(52) U.S. Cl.
CPC ............ *G06F 9/4451* (2013.01); *G06F 9/542* (2013.01); *G06F 9/543* (2013.01); *G06F 9/547* (2013.01)

(58) Field of Classification Search
CPC ........ G06F 9/4451; G06F 9/542; G06F 9/543; G06F 9/547; G06F 16/958
See application file for complete search history.

(56) References Cited

U.S. PATENT DOCUMENTS

| | | | | |
|---|---|---|---|---|
| 10,853,481 B1* | 12/2020 | Magnuson | ............. | G06F 21/52 |
| 11,340,872 B1* | 5/2022 | VanAntwerp | .......... | H04L 67/56 |
| 2015/0039996 A1* | 2/2015 | Kwon | .................. | G06F 40/143 |
| | | | | 715/234 |
| 2015/0039999 A1* | 2/2015 | Chasman | ................ | H04L 67/10 |
| | | | | 715/234 |
| 2015/0227630 A1* | 8/2015 | Solheim | ............. | G06F 16/9574 |
| | | | | 707/722 |
| 2015/0242529 A1* | 8/2015 | Kinger | ............... | G06F 16/9577 |
| | | | | 707/770 |
| 2015/0261506 A1* | 9/2015 | Torgemane | ........ | H04N 21/4312 |
| | | | | 717/107 |

(Continued)

*Primary Examiner* — Andy Ho
*Assistant Examiner* — Abdou K Seye
(74) *Attorney, Agent, or Firm* — Polygon IP, LLP

(57) ABSTRACT

Disclosed herein are systems, methods, and devices that configure components of applications. A computing platform implemented using a server system may be configurable to cause determining an initial configuration of an application component that is configured to enable interactions with a user. The initial configuration is determined based on configuration parameters stored in the computing platform. The computing platform may also cause including a first instance of the application component in a webpage, the first instance being generated based on the initial configuration. The computing platform may also cause receiving a function call from the webpage, the function call being generated based on a user interaction with the webpage. The computing platform may also cause implementing a new instance of the application component responsive to the function call, the new instance comprising at least one change implemented based, at least in part, on the function call.

18 Claims, 9 Drawing Sheets

(56) References Cited

U.S. PATENT DOCUMENTS

| | | |
|---|---|---|
| 2017/0147297 A1* | 5/2017 | Krishnamurthy ......... G06F 8/34 |
| 2019/0005460 A1 | 1/2019 | Wang et al. |
| 2020/0097613 A1 | 3/2020 | Shah et al. |
| 2020/0127951 A1 | 4/2020 | Shah et al. |

* cited by examiner

ENHANCEMENT OF APPLICATION SERVICE ENGAGEMENT BASED ON USER BEHAVIOR

FIELD OF TECHNOLOGY

This patent document relates generally to deployment of application components, and more specifically to the enhancement of deployment of application components in distributed computing environments.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of service provided via the cloud is an on-demand computing platform. In an on-demand computing platform, the cloud computing service provider manages the underlying infrastructure, which may be a distributed database infrastructure, while users may store data in the cloud rather than on their premises. Accordingly, an on-demand computing platform may be used to implement applications, as well as components of applications, in a distributed manner.

BRIEF DESCRIPTION OF THE DRAWINGS

The included drawings are for illustrative purposes and serve only to provide examples of possible structures and operations for the disclosed inventive systems, apparatus, methods and computer program products for enhancement of application service deployment. These drawings in no way limit any changes in form and detail that may be made by one skilled in the art without departing from the spirit and scope of the disclosed implementations.

DETAILED DESCRIPTION

Figure 1:
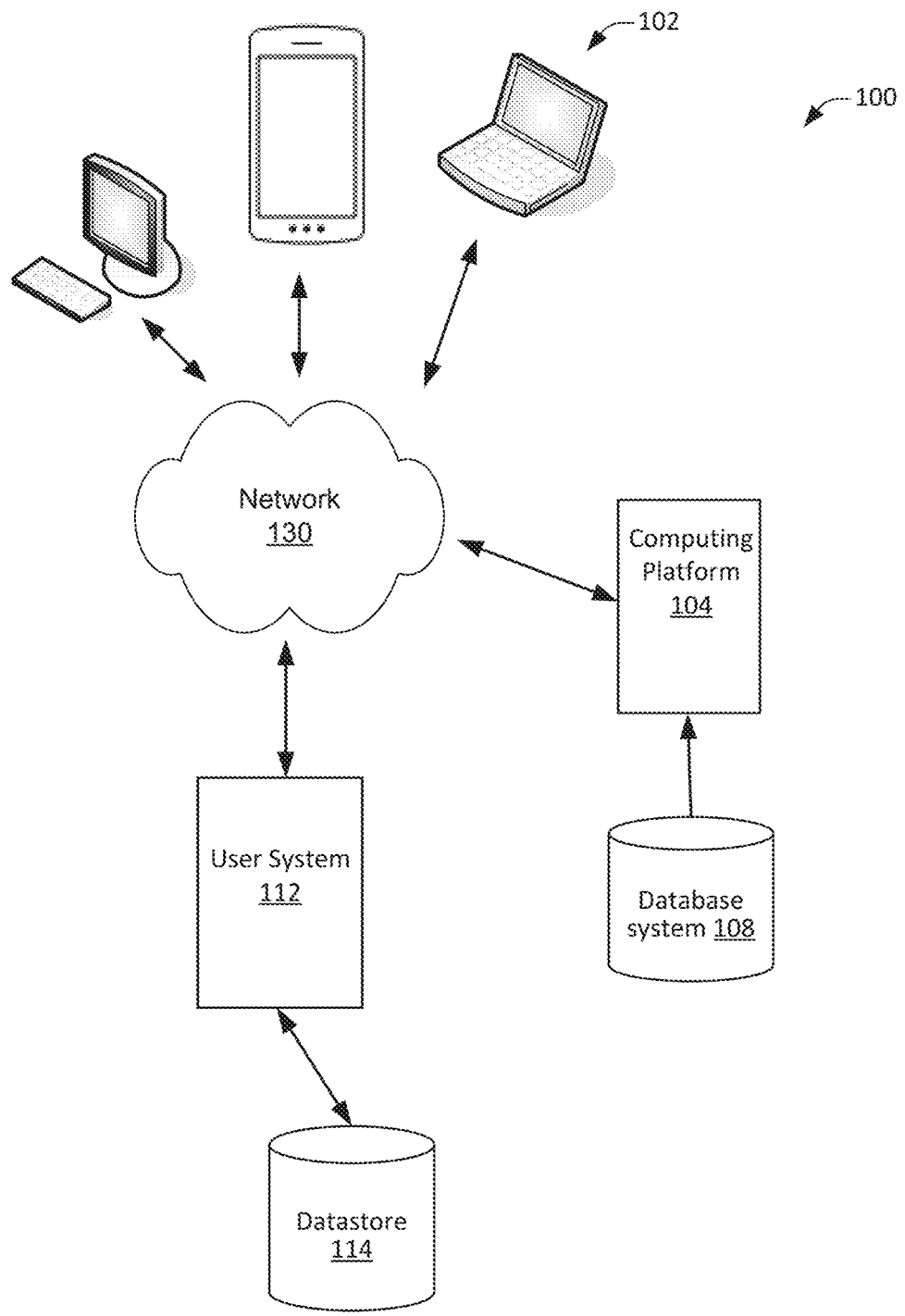
FIG. 1 illustrates an example of an arrangement of components in an application service deployment system, configured in accordance with one or more embodiments.

On-demand computing platforms may be used to host applications that can be used by numerous users in a distributed manner across various geographical locations. Accordingly, in such computing platforms, utilization of the application is provided to the users by one or more servers accessible over the Internet rather than installing software locally on in-house computer systems. In this way, the application is provided to the user via a web-based interface, and execution of the application as well as storage of associated files and data is implemented using a distributed or cloud-based computing infrastructure.

Users of on-demand computing platforms, and applications supported by such computing platforms, may be distributed across many different geographical regions. Moreover, such applications may be software as a service (SaaS) applications in which an on-demand computing platform hosts the application, and users may access the applications via a communications network, such as the internet. In some cases, users may access applications via a user system which is communicatively coupled to the on-demand computing platform. Conventional implementations of such user systems and computing platforms remain limited because they are not able to identify and implement changes in components of the SaaS application dynamically, in real time, and based on the user's behavior.

Various embodiments disclosed herein provide an enhanced ability to deploy components of applications in a distributed manner, and in a way that may be customized and determined by user behavior. As will be discussed in greater detail below an instance of an application component may be deployed in the context of a webpage that is provided to a user, and the user may interact with the webpage and the application component. As will also be discussed in greater detail below, embodiments disclosed herein provide the ability to dynamically change or modify the deployed instance of the application component in response to particular user actions and inputs. In this way, the deployed component of the on-demand application may be automatically updated in real time based on the user's actions. In this way, deployment and efficiency of the application component is enhanced, and communication between the user and another entity, such as an administrator, is improved. As will be discussed in greater detail below, a particular application may have hundreds of different instances simultaneously deployed. Accordingly, embodiments disclosed herein enable the efficient and concurrent dynamic customization of all deployed instances.

In various embodiments, components of an on-demand application may be implemented to provide one or more functionalities to a user or a customer's webpage. Accordingly, and application component, such as a widget, may be included in the webpage and may be configured to provide functionalities such as communications channels (as may be appropriate for customer support), and menu channels that provide enhanced website navigation. The application component may include one or more graphical user interface elements, such as a button, a text field, or a representation of a hyperlink. In this way, the application component may enable the implementation and integration of features, such as a chat bot, initiation of a call, enhanced website navigation, and/or text entry.

In one example, a user may be scrolling through a website, and an application component may be implemented to provide one or more functionalities for the website, such as customer support. In this example, the user may perform one or more actions, such as adding a particular product to the user's virtual cart. The product may have a designated price, among other features. In response to the user taking this action, a user system and computing platform may implement one or more changes to the deployed instance of the application component. For example, the instance of the application component may be replaced with a new instance that includes a change that replaces a first button that directs to a chatbot with a second button that connects to a customer service representative. In this way, the instance of the application component is dynamically updated and modified based on user actions and behavior.

FIG. 1 illustrates an example of a system for enhancement of application service deployment, configured in accordance with some embodiments. As will be discussed in greater detail below, components of a computing platform may be configured to enable the enhanced implementation of changes to application components and the deployment of new instances of application components in a dynamic and automated manner. More specifically, an interface between a computing platform and a user system may be provided such that modifications and changes to instances of application components may be implemented responsive to specific user behaviors and/or actions, thus enabling enhanced modification and deployment of such instances as the user interacts with the application components.

In various embodiments, system 100 includes various client machines, which may also be referred to herein as user devices, such as client machine 102. In various embodiments, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various embodiments, client machine 102 is configured to execute one or more applications that may utilize a user interface. Accordingly, a user may request and view various different webpages via client machine 102. In various embodiments, a user interface may be used to present a webpage to the user. Accordingly, the user interface may utilize a web browser executed on client machine 102.

System 100 further includes user system 112. In some embodiments, user system 112 may be implemented as discussed in greater detail below with reference to FIG. 7. In some embodiments, user system 112 is configured to generate and serve webpages that may be viewed by a user via one or more devices, such as client machine 102. Accordingly, in some embodiments, user system 112 includes a web server. As will be discussed in greater detail below, such webpages are used to provide a web-based interface between the user and an application that is deployed in a distributed environment. Accordingly, various application components may be incorporated within a webpage that is displayed to the user, and the user may interact with such application components. In one example, the application component may be a widget, a snap-in, or any other application module or configurable data structure. In some embodiments, user system 112 is coupled to datastore 114 which may be configured to store data associated with webpages served by user system 112, and may provide local storage for user system 112.

System 100 additionally includes computing platform 104. As shown in FIG. 1, computing platform may also be coupled to database system 108. As discussed in greater detail below with reference to FIG. 7, computing platform 104 is configured to host one or more distributed on-demand applications. Moreover, computing platform 104 may also include an interface configured to handle function calls, also referred to herein as server calls, generated by user system 112. The interface may be implemented using components of a database system, such as an application program interface (API), discussed in greater detail below with respect to FIG. 7. Accordingly, application data may be stored and maintained by components of computing platform 104. As also shown in FIG. 1, computing platform 104 is coupled to database system 108, which is configured to provide data storage utilized by computing platform 104. As will be discussed in greater detail below, database system 108 may be configured to include a system cache implemented as a cache layer which is used to store instances of application components. In various embodiments, database system 108 includes system data storage and a tenant database, as discussed in greater detail below with reference to FIG. 7. In various embodiments, computing platform 104 is also coupled to communications network 130, and is communicatively coupled to user system 112 and client machine 102.

Figure 2:
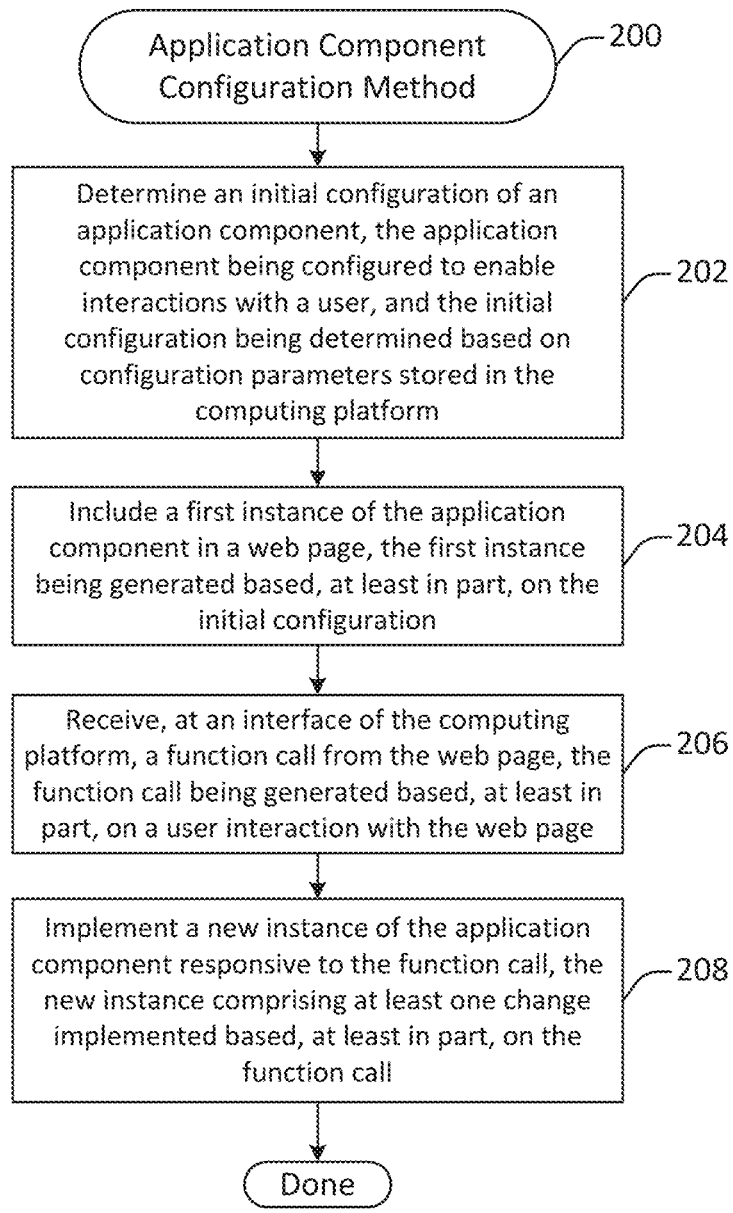
FIG. 2 illustrates an example of a method for enhancement of application service deployment, performed in accordance with one or more embodiments.

FIG. 2 illustrates an example of a method for enhancement of application service deployment, implemented in accordance with some embodiments. As similarly discussed above, components of a computing platform may be configured to enable the enhanced implementation of changes to application components and the deployment of new instances of application components in a dynamic and automated manner. Accordingly, methods disclosed herein, such as method 200, may be implemented to provide modifications and changes to instances of application components responsive to specific user behaviors and/or actions, thus enabling enhanced modification and deployment of such instances as the user interacts with the application components.

Method 200 may commence with operation 202 during which an initial configuration of an application component is determined. As discussed above, the application component is configured to enable interactions with a user, and may be a component such as a widget. In various embodiments, the initial configuration of the application component is determined based on configuration parameters stored in the computing platform. Such configuration parameters may have been previously stored in a computing platform by an entity, such as an account administrator.

Method 200 may proceed to operation 204 during which a first instance of the application component is included in a webpage. In some embodiments, the first instance is generated based, at least in part, on the initial configuration. Accordingly, an initial instance of the application component may be generated and deployed by a user system as part of an interface for a distributed application. As noted above, the initial instance of the application component may be included in a webpage that is provided to the user.

Method 200 may proceed to operation 206 during which a function call is received from the webpage. In some embodiments, the function call is generated based, at least in part, on a user interaction with the webpage. Accordingly, the user may interact with the webpage and take one or more actions. For example, the user may scroll past the application component, may click on a button of the application component, or may enter text into a text field of the application component. The input may be received by the application component, and the application component may generate a function call that is sent to an interface of the computing platform. As will be discussed in greater detail below, the interface may be a custom interface that is configured to enable the generation and deployment of new or modified instances of application components. Accordingly, the user action may trigger the function call to the interface of the computing platform.

Method 200 may proceed to operation 208 during which a new instance of the application component is implemented responsive to the function call. In some embodiments, the new instance includes at least one change implemented based, at least in part, on the function call. Accordingly, in response to receiving the function call, the computing platform may generate a new instance of the application component and provide the new instance to the user system. The user system may then deploy the new instance of the application component in the webpage. In another example, the user system may implement a modification of the instance of the application component. In this way, the user system may modify the instance of the application component and deploy the modified instance in response to the function call.

Figure 3:
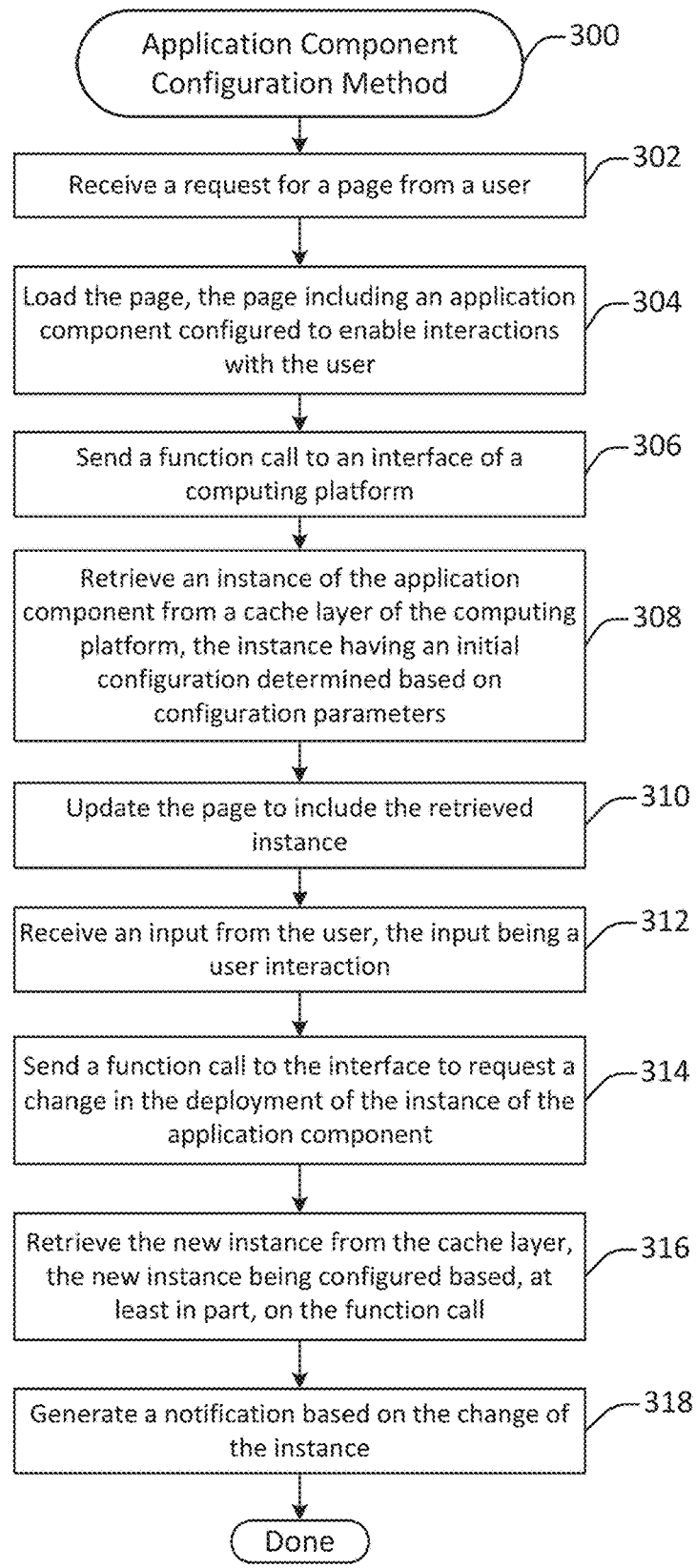
FIG. 3 illustrates another example of a method for enhancement of application service deployment, performed in accordance with one or more embodiments.

FIG. 3 illustrates another example of a method for enhancement of application service deployment, implemented in accordance with some embodiments. As will be discussed in greater detail below, methods disclosed herein, such as method 300, may be implemented to dynamically change deployment of instances of application components based on user inputs, and utilize a custom interface between a user system and a computing platform.

Method 300 may commence with operation 302 during which a request for a page may be received. In some embodiments, the request may be received at a user system, and the request may have originated from a client machine used by a user. As discussed above, a client machine may be a personal computer, a mobile device, or a laptop computer. Accordingly, a user may be operating a browser on the client machine in which the user is navigating to a website or a portion of a website, and the client machine may issue a request for a particular webpage to be loaded.

Method 300 may proceed to operation 304 during which the requested page may be loaded. As similarly discussed above, the webpage may include multiple different components that are displayed to a user. For example, the webpage may include information regarding a product for purchase, and may include additional information regarding the retailer of the product. In one example, the webpage is configured as a container page configured to host an application component specific to a particular application service provider. More specifically, the webpage is configured to host custom code specific to an instance of the application. In some embodiments, the application component may be a widget, a snap-in, or other configurable application module or data structure. Accordingly, the webpage is a container page that is configured to include an application component that is configured to enable and facilitate interactions with the user that are customized and configured based on configuration parameters that have been determined and generated for a particular instance of the application component.

Method 300 may proceed to operation 306 during which a function call may be sent to an interface of a computing platform. In various embodiments, the function call may invoke an interface between the user system and the computing platform, and may be used to issue a request of a particular component of the computing platform. In various embodiments, the function call includes a dynamically generated snippet of code that includes data values and parameters configured to identify a particular application component instance. Such data may also be referred to herein as deployment data. In one example, the function call may be a representational state transfer (REST) call that is used to request a particular instance of an application component from a storage location of the computing platform. In one example, the request is issued to a cache layer of a database system of the computing platform. The instance of the application component may be identified using one or more customer identifiers and one or more application identifiers, as well as additional identifiers, such as user and device identifiers. In one example, the instance of the application component is identified based on a deployment name, which may be a custom name given to a configuration of an application component by an entity, such as an administrator. Accordingly, in various embodiments, the instance may be identified using a custom deployment name that may be defined by an administrator and invoked using the computing platform interface.

Furthermore, according to some embodiments, the custom deployment name is mapped to a data object including custom routing information stored in the computing platform. More specifically, the custom routing information may define how a user request should be routed and handled by the web page when it receives a request from a user. For example, the custom routing information may identify a particular support channel, such as a specific call center, for a particular deployed instance of an application component. As well as a mapping between the support channel and a deployed instance of the application component. In various embodiments, the mapping between the two may be stored in the cache layer of the computing platform, and may be invoked via the interface.

Method 300 may proceed to operation 308 during which an instance of the application component may be retrieved from a cache layer of the computing platform. Accordingly, the identified instance of the application component may be retrieved from the cache layer, and may be provided to the user system for inclusion in the webpage. In some embodiments, the instance has an initial configuration determined based on configuration parameters. Accordingly, the instance of the application component may have been generated in accordance with initial configuration parameters that were set by an entity, such as an administrator.

Method 300 may proceed to operation 310 during which the page is updated to include the retrieved instance of the application component. Accordingly, the retrieved instance of the application component may be included in the webpage and may be displayed to the user. As discussed above, the application component may be a widget such as a chatbot or a channel menu. Thus, an instance of a chatbot or channel menu may be included in the webpage that is provided to the user.

Method 300 may proceed to operation 312 during which an input may be received at the user system. The input may be generated based on a user interaction with the webpage. Accordingly, as similarly discussed above, the user may interact with the webpage via a client machine. For example, the user may scroll through contents of the webpage, or may interact with one or more portions of the application component in the webpage, such as clicking a button. In one example, the user may click an "add to cart" button to purchase an item. As disclosed herein, a user action may be any interaction between a user and any portion of a web page, or entity associated with the web page. For example, a user creating a user account or filling out a form on another web page or computing platform may be detected by the user system that may have access to or visibility of such other web page or computing platform. In this way other user-related data events may be identified as user actions as well. Accordingly, such user actions and user behavior may be identified and received as inputs that are provided to the user system.

Method 300 may proceed to operation 314 during which a function call is sent to the interface to request a change in the deployment of the instance of the application component. Accordingly, in response to receiving an input identifying an interaction between the user and the webpage, the user system may issue another function call to the computing platform via the interface. As discussed above, the function call may be a REST call, and may be issued to a database system of the computing platform. For example, the function call may be issued to a cache layer. As also noted above, the function call may be configured to request a new instance of the application component.

In various embodiments, the type of function call and the requested change may be configured and identified based on one or more rules defined by an entity, such as an administrator. For example, an administrator may have previously determined that a particular user action, such as clicking a button, should cause a specific change in the application component, such as the addition or removal of other buttons. Moreover, aspects of the function call and requested change may be determined based on contextual data as well. For example, data values included in data objects associated with the application components may be used to identify a particular change. More specifically, if an application component is a button configured to add an item or product to a virtual shopping cart, additional contextual data may also be retrieved and utilized, such as a type of product that has been added, or a price of the product. In this way, a product price and/or type may be used to identify specific one or more changes, such as replacing a "chat" button with a "call" button. In this example, the user action was used to identify a change in a communication channel provided by the application component.

In some embodiments, the different communication channels may have different priorities, and user actions may cause application components with higher priorities to be implemented, thus increasing the priority of the communications channel represented in the application component. For example, an instance of an application component may include multiple communications channels, which may be different modalities, such as a (1) chatbot, a (2) high priority chat, (3) WhatsApp, and a (4) high priority WhatsApp. As will be discussed in greater detail below, the instance may be dynamically changed such that the channel menu represented by the instance shows options (2,4) for high priority and (1,3) for low priority engagements. As will be discussed in greater detail below, only (2,4) are displayed responsive to particular user action.

Moreover, additional types of changes may be implemented as well. For example, a user action may be used to identify a change in a presentation, such as a color scheme, of graphical user interface components of the application component. Moreover, changes may include showing or hiding different communications channels, changing the priority and order in which they are displayed in the user interface if the action is to move from multiple communication channels to one. As will be discussed in greater detail below, an entity, such as an administrator, may define all communications channels that can be shown/hidden by default in an initial instance of a deployment. As will also be discussed in greater detail below, when the user interacts with a web page, based on the action, the interface will be invoked, and a change or modification may be implemented for the instance. For example, the change may reorder the support channels displayed in the deployed instance. Such reordering may include showing/hiding and changing the order priority in which they are displayed. Additional aspects of changes in application components are discussed in greater detail below with reference to FIG. 4.

Method 300 may proceed to operation 316 during which the new instance is retrieved from the cache layer. In some embodiments, the new instance is configured based, at least in part, on the function call. For example, the new instance may be identified and/or generated based on parameters and identifiers included in the function call, such as a deployment name. Accordingly, the new instance of the application component may be identified and may be retrieved from the cache layer and may be provided to the user system for inclusion in the webpage. For example, and as similarly discussed above, a widget may be updated to remove some buttons while including a new button that enables a customer support call. In this way, the new application component may be dynamically identified and deployed in the webpage in response to a particular user action or behavior.

In another example, the instance of the application component may be updated to switch or change icons that may be displayed by the application component, and also modify a custom URL associated with the icon. For example, the application component may be a widget that includes a channel menu which may include a displayed question mark or a phone icon. In various embodiments, the icon is customizable and has a custom URL that may be utilized to configure routing of a user request or action. In one example, when a user loads a web page after service hours, the loading of the page and identification of contextual metadata, such as the timestamp, could cause the interface to be invoked to drop all other options in the channel menu, and only show the icon associated with a custom URL that points to knowledge database resources, such as articles, or a community forum rather than active engagement channels which are offline. In this way, the custom URL may be changed dynamically when a new instance of the application component is deployed.

Method 300 may proceed to operation 318 during which a notification is generated based on the change of the instance. Accordingly, a message may be generated that includes relevant data regarding the change in the deployment of the application component that has occurred. The message may include data such as a deployment name/identifier, user identifier, application identifier, as well as other metadata such as a timestamp. In various embodiments, the notification may be sent to a particular entity, such as an administrator or a customer service representative. In this way, an administrator or customer service representative may be provided with a notification message in real time as such a change is occurring. In some embodiments, the notification may be stored and logged in a database system. In one example, the notifications may be logged and stored as data events that may be subsequently be queried and analyzed by an administrator.

Figure 4:
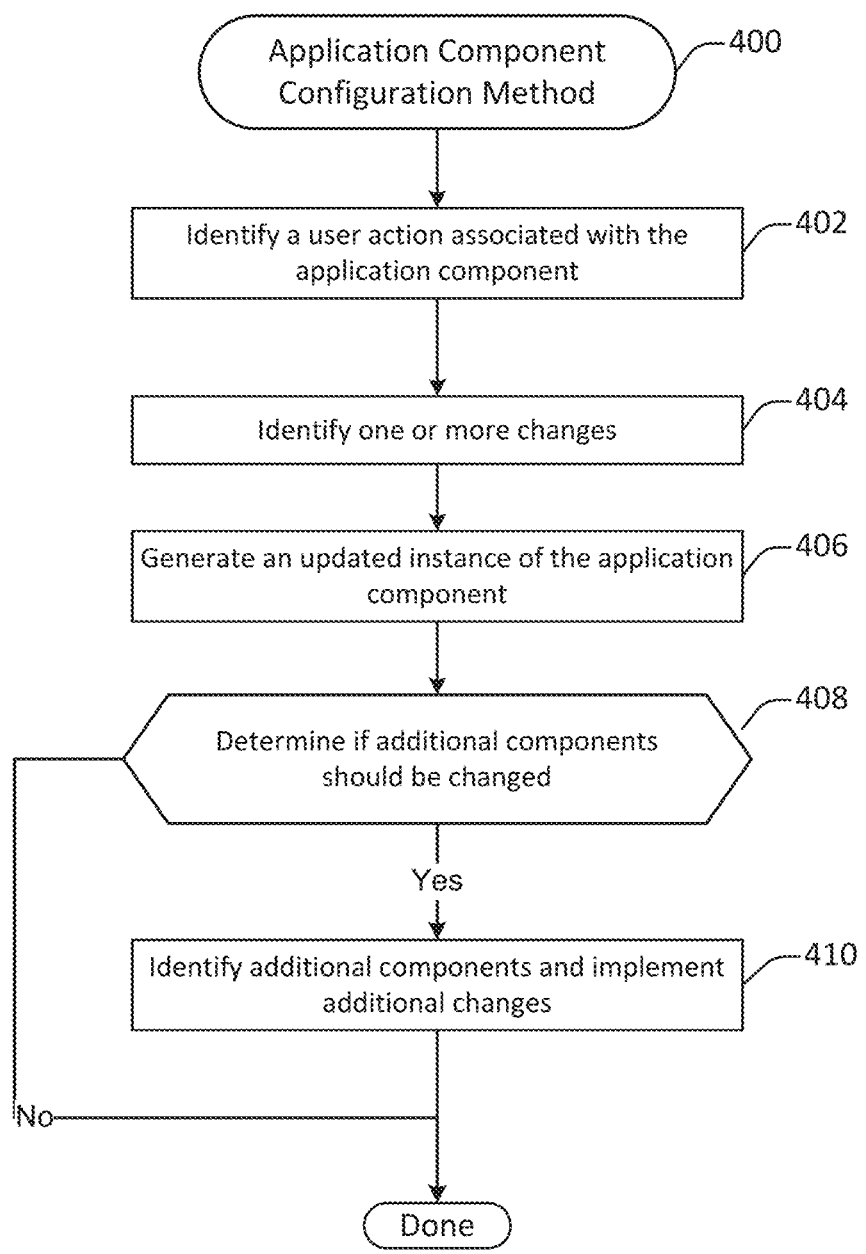
FIG. 4 illustrates yet another example of a method for enhancement of application service deployment, performed in accordance with one or more embodiments.

FIG. 4 illustrates yet another example of a method for enhancement of application service deployment, implemented in accordance with some embodiments. Methods disclosed herein, such as method 400, may be implemented to dynamically implement changes to instances of application components such that new instances of application components may be identified and deployed responsive to particular user actions and/or behaviors.

Method 400 may commence with operation 402 during which a user action associated with an application component may be identified. As similarly discussed above, the user action may be detected as an input received during a user interaction with the webpage. As noted above, the user may interact with one or more portions of the application component in the webpage, such as clicking a button. Additional user actions may also include interacting with a menu to navigate to a specific page, logging into an account, taking a screen shot of a product, spending a particular amount of time on a product, and using a particular type of device, such as a mobile device, to access the webpage. Such user actions and user behavior may be identified and received as inputs that are provided to the user system. Accordingly, during operation 402, a particular user action may be identified.

Method 400 may proceed to operation 404 during which one or more changes may be identified. In various embodiments, the changes are identified based on one or more rules that may have been previously determined by an entity, such as an administrator. Accordingly, an administrator may have previously configured a rules engine of the user system to include logic that is configured to map particular user actions to specific changes in instances of application components. In various embodiments, such a rules engine may be implemented using components of a user system, such as a processor system and a memory system, discussed in greater detail below with reference to FIG. 7. In one example, clicking a button to cancel a subscription may cause a change in an application component that generates a button representing a communications channel, such as a telephone call, with a customer service representative. Such an association between the user action and the change may have been previously stored for that particular application component during an initial configuration process.

In one example, during an initial configuration process, an entity, such as an administrator may define one or more communications channels that are shown in an instance by default. The web page's code that is used to invoke the interface is exposed to the computing platform when specific actions are taken on the web page by the user. In various embodiments, there might be multiple portions or locations of the web page where a specific action by the user causes the interface to be invoked with each portion corresponding to a different user action/input. In some embodiments, the input provided to the interface is an ordered list of communications channels from the list of communications channels that was defined during the initial configuration and setup process. Thus, user inputs and patterns of user interactions with the web page may be used to order components of the instance of the application component, and such an ordered list may be provided as an input to the computing platform via the interface for updating of the instance.

Method 400 may proceed to operation 406 during which an updated instance of the application component may be generated. Accordingly, if the new instance is not already stored in a database system of the computing platform, such as in a cache layer, the new instance may be generated to implement the requested changes. Accordingly, the initial configuration of the application may be modified based on the changes identified during operation 404. In some embodiments, the cache layer may have been pre-populated with the updated instance. For example, during a configuration process when an entity, such as an administrator, configured the rules engine and logic for an application component, an updated instance may have been generated and stored for each change identified by the logic to pre-populate the cache layer with any updated instance that might be requested for that application component.

Method 400 may proceed to operation 408 during which it may be determined if additional components should be changed. Accordingly, it may be determined that one or more changes to other applications components should be made, and such a determination may be made based on the logic stored in the rules engine. In this way, other application components displayed on the webpage may also be changed responsive to the user action. If it is determined that no additional application components should be changed, the updated instance generated during operation 406 may be deployed, and method 400 may terminate. If it is determined that additional components should be changed, method 400 may proceed to operation 410.

Accordingly, at operation 410, additional components may be identified and additional changes may be implemented. As discussed above, the additional components may be identified based on previously configured logic stored in the rules engine. Accordingly, during operation 410, additional function calls may be made for each identified additional component, and updated additional components may be generated and deployed as well. In this way, the deployment of multiple application components may be changed dynamically and responsive to a particular user action or input.

Figure 5:
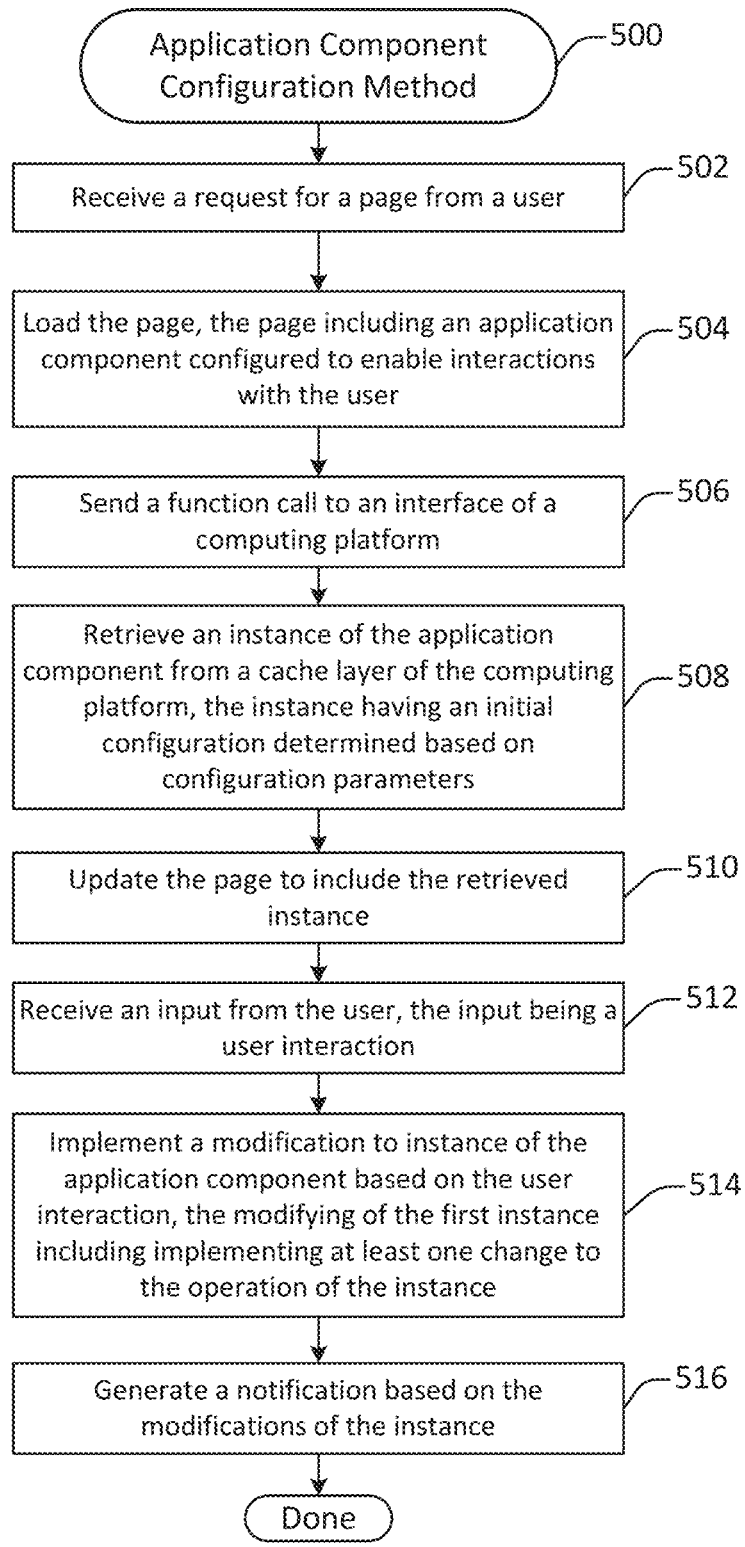
FIG. 5 illustrates an additional example of a method for enhancement of application service deployment, performed in accordance with one or more embodiments.

FIG. 5 illustrates an additional example of a method for enhancement of application service deployment, implemented in accordance with some embodiments. Methods disclosed herein, such as method 500, may be implemented to provide modifications and changes to instances of application components that may be implemented responsive to specific user behaviors and/or actions. As will be discussed in greater detail below, the modifications of instances of application components may be implemented at a user system thus reducing a number of functional calls that are made to a computing platform. More specifically, once an initial instance of the application component is loaded, no additional server calls are required from a user system to the computing platform.

Method 500 may commence with operation 502 during which a request for a page may be received. In some embodiments, the request may be received at a user system, and the request may have originated form a client machine used by a user. As discussed above, a user may be operating a browser on the client machine in which the user is navigating to a website or a portion of a website, and the client machine may issue a request for a particular webpage to be loaded.

Method 500 may proceed to operation 504 during which the requested page may be loaded. As discussed above, the webpage is configured as a container page configured to host an application component specific to a particular application service provider. Accordingly, the webpage is configured to include an application component configured to enable interactions with the user.

Method 500 may proceed to operation 506 during which a function call may be sent to an interface of a computing platform. As similarly discussed above, the function call may invoke an interface between the user system and the computing platform, and may be used to issue a request of a particular component of the computing platform. In one example, the request is issued to a cache layer of a database system of the computing platform. The instance of the application component may be identified using one or more customer identifiers and one or more application identifiers, as well as additional identifiers, such as user and device identifiers. In one example, the instance of the application component is identified based on a deployment name, which may be a custom name given to a configuration of an application component by an entity, such as an administrator.

Method 500 may proceed to operation 508 during which an instance of the application component may be retrieved from a cache layer of the computing platform. Accordingly, the identified instance of the application component may be retrieved from the cache layer, and may be provided to the user system for inclusion in the webpage. As discussed above, the instance has an initial configuration determined based on configuration parameters. Accordingly, the instance of the application component may have been generated in accordance with initial configuration parameters that were set by an entity, such as an administrator.

Method 500 may proceed to operation 510 during which the page is updated to include the retrieved instance of the application component. Accordingly, the retrieved instance of the application component may be included in the webpage and may be displayed to the user. As discussed above, the application component may be a widget, snap-in, or other application module, and such instance of the application component may be included in the webpage that is provided to the user.

Method 500 may proceed to operation 512 during which an input may be received at the user system. As discussed above, the input may be generated based on a user interaction with the webpage. Accordingly, as similarly discussed above, the user may interact with the webpage via a client machine, and such user actions and user behavior may be identified and received as inputs that are provided to the user system.

Method 500 may proceed to operation 514 during which a modification to the instance of the application component is implemented based on the user interaction. In various embodiments, the modifying of the first instance includes implementing at least one change to the operation of the instance. In various embodiments, a particular modification may be identified and configured based on one or more rules defined by an entity, such as an administrator. As similarly discussed above, an administrator may have previously determined that a particular user action should cause a specific modification in the application component, and such a determination may have been stored as logic in a rules engine of the user system.

In various embodiments, the implementation of the modification may be implemented by the user system. Accordingly, one or more components of the user system may update and modify the instance of the application component based on the user action, and may deploy the updated instance of the application component. For example, the user system may update the application component to remove one or more buttons, or change a communications channel included in the application component. In this way, dynamic modification and deployment of the application component may be implemented at the user system, and without an additional function call to the computing platform.

Method 500 may proceed to operation 516 during which a notification may be generated based on the modifications of the instance. As similarly discussed above, a message may be generated that includes relevant data regarding the change in the deployment of the application component that has occurred, such as a deployment name/identifier, user identifier, application identifier, as well as other metadata such as a timestamp. In various embodiments, the notification may be sent to a particular entity, such as an administrator or a customer service representative. In some embodiments, the notification may be stored and logged in a database system as data events that may be subsequently be queried and analyzed by an administrator.

Figure 6:
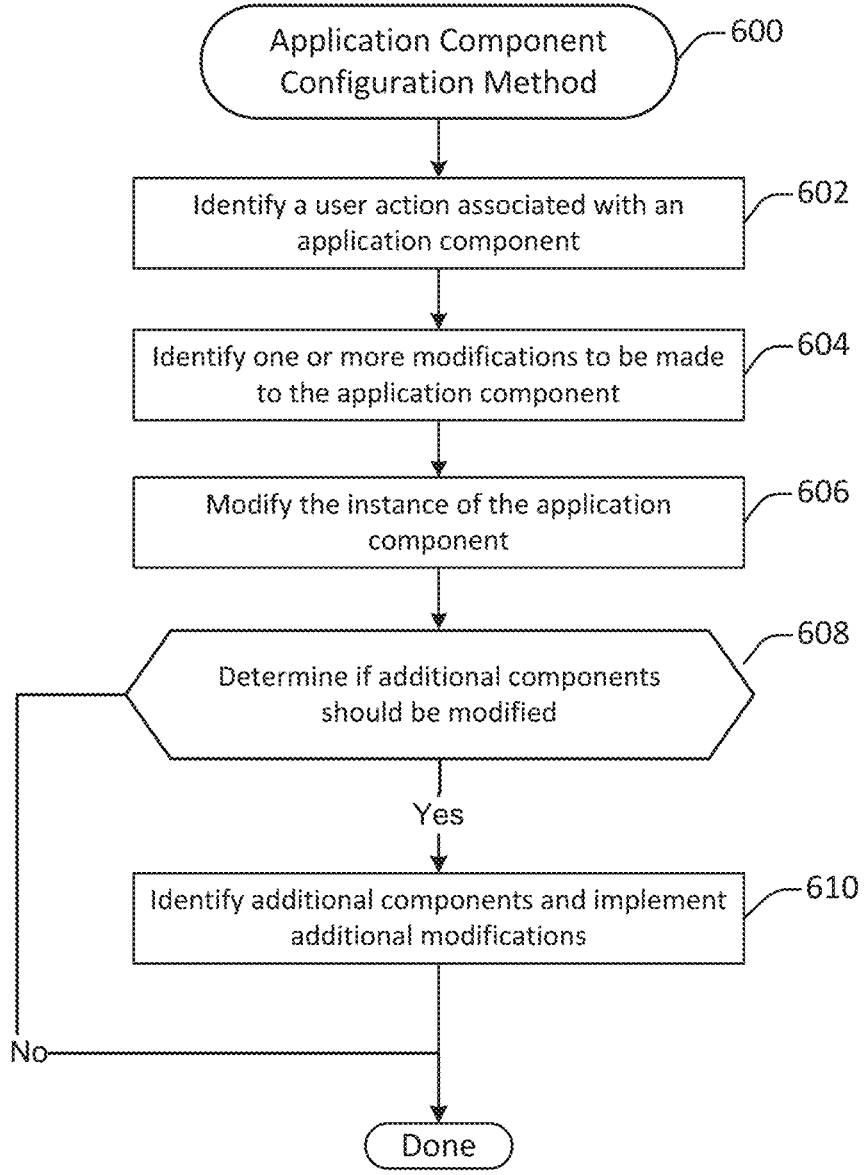
FIG. 6 illustrates another example of a method for enhancement of application service deployment, performed in accordance with one or more embodiments.

FIG. 6 illustrates another example of a method for enhancement of application service deployment, implemented in accordance with some embodiments. Methods disclosed herein, such as method 600, may be implemented to provide modifications to instances of application components that may be implemented at a user system thus reducing a number of functional calls that are made to a computing platform. In this way, application components may be modified and updated responsive to specific user behaviors and/or actions with a reduced number of functional calls to components of a computing platform.

Method 600 may commence with operation 602 during which a user action associated with an application component may be identified. As similarly discussed above, the user action may be detected as an input received during a user interaction with the webpage. As noted above, the user may scroll through contents of the webpage, or may interact with one or more portions of the application component in the webpage, such as clicking a button.

Method 600 may proceed to operation 604 during which one or more modifications may be identified. In various embodiments, the modifications are identified based on one or more rules that may have been previously determined by an entity, such as an administrator. Accordingly, an administrator may have previously configured a rules engine of the user system to include logic that is configured to map particular user actions to specific modifications in instances of application components. Such associations between user actions and modifications may have been previously stored for that particular application component during an initial configuration process, as has been previously discussed.

Method 600 may proceed to operation 606 during which the instance of the application component may be modified based on the identified modifications. Accordingly, if the instance of the application component stored at the user system may be modified in accordance with the modifications identified during operation 604, and in accordance with the modifications specified by the rules engine. In various embodiments, a datastore of the user system may have been pre-populated with the modified instance of the application component. As similarly discussed above, during a configuration process when an entity, such as an administrator, configured the rules engine and logic for the application component, modified instances may have also been generated and stored at the datastore of the user system for each change identified by the logic to pre-populate the datastore with any modified instance that might be requested for that application component.

Method 600 may proceed to operation 608 during which it may be determined if additional components should be modified. Accordingly, it may be determined that one or more changes to other applications components should be made, and such a determination may be made based on the logic stored in the rules engine. In this way, other application components displayed on the webpage may also be changed responsive to the user action. If it is determined that no additional application components should be modified, the modified instance generated during operation 406 may be deployed, and method 600 may terminate. If it is determined that additional components should be modified, method 600 may proceed to operation 610.

Method 600 may proceed to operation 610 during which additional components may be identified and modified. As discussed above, the additional components may be identified based on previously configured logic stored in the rules engine. Accordingly, during operation 610, additional instances of additional application components may be identified and modified by one or more components of the user system. Moreover, the modified additional components may be deployed as well. In this way, the deployment of multiple application components may be modified dynamically and responsive to a particular user action or input, and with a reduced number of function calls to the computing platform.

Figure 7:
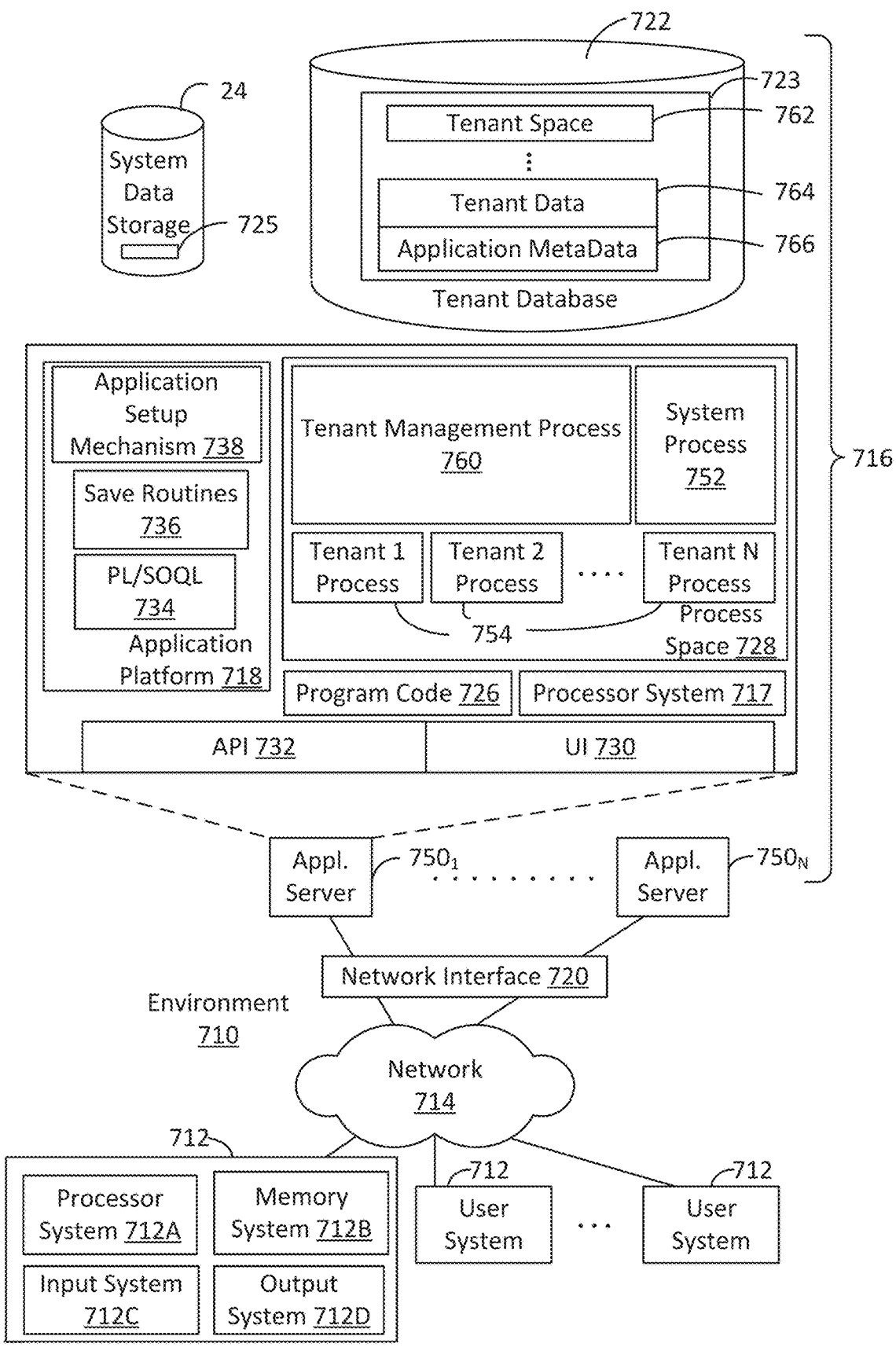
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based application component deployment system. For example, in some implementations, system 716 may include application servers configured to implement and execute deployment of software applications and components of software applications. The application servers may be configured to provide related data, code, forms, webpages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 7 12D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as components of a computing platform, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
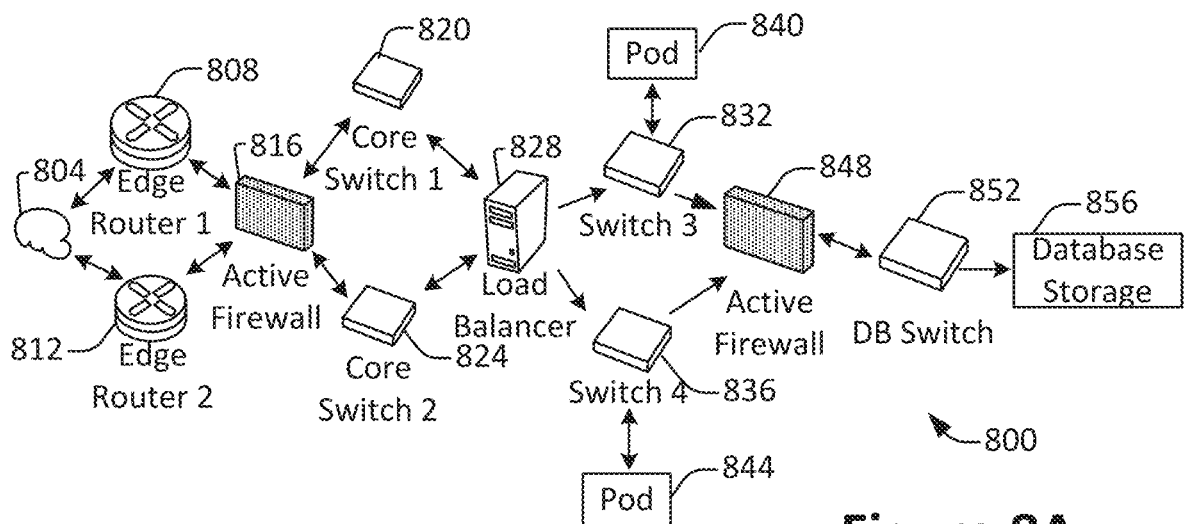
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process application information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
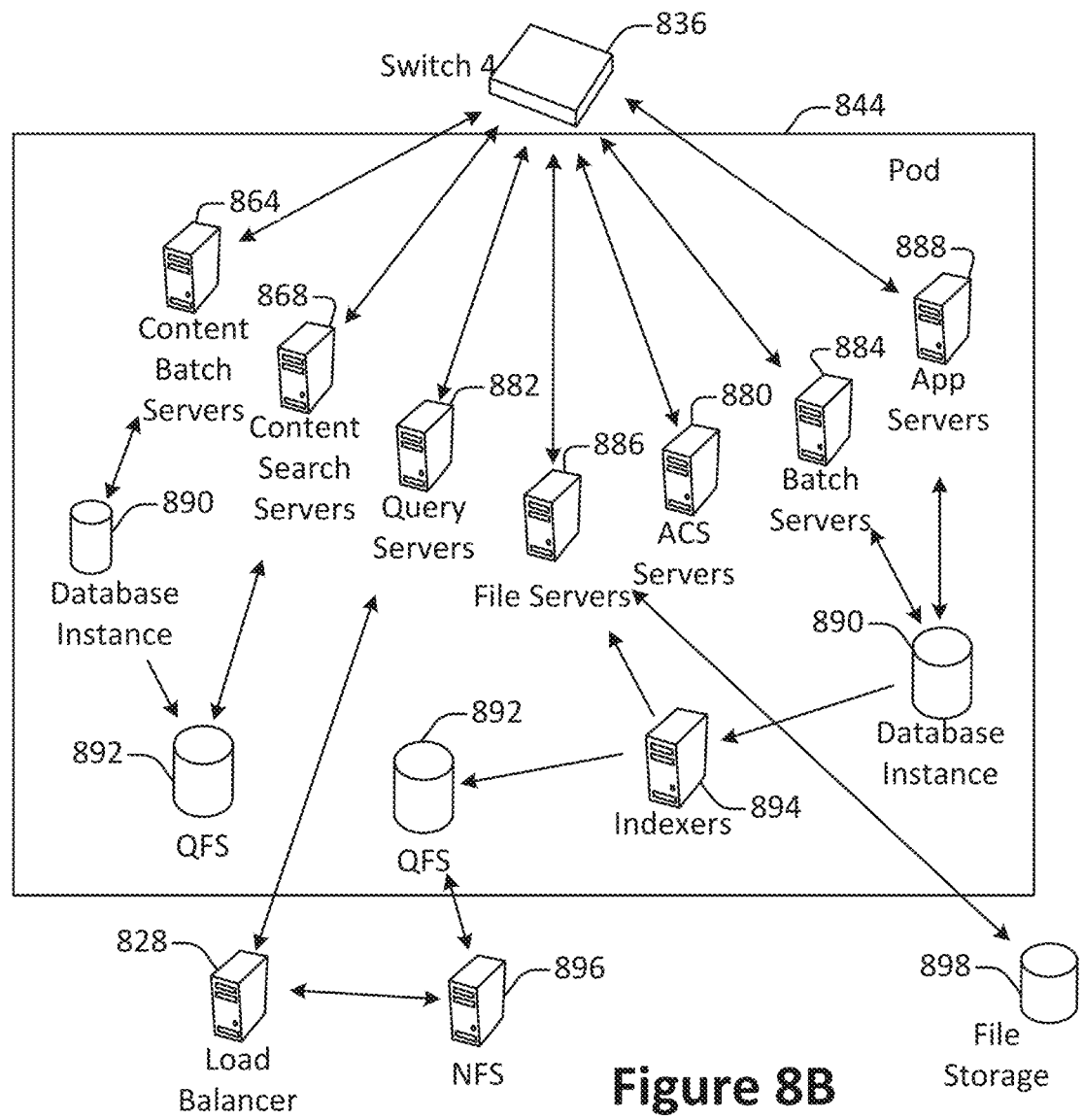
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
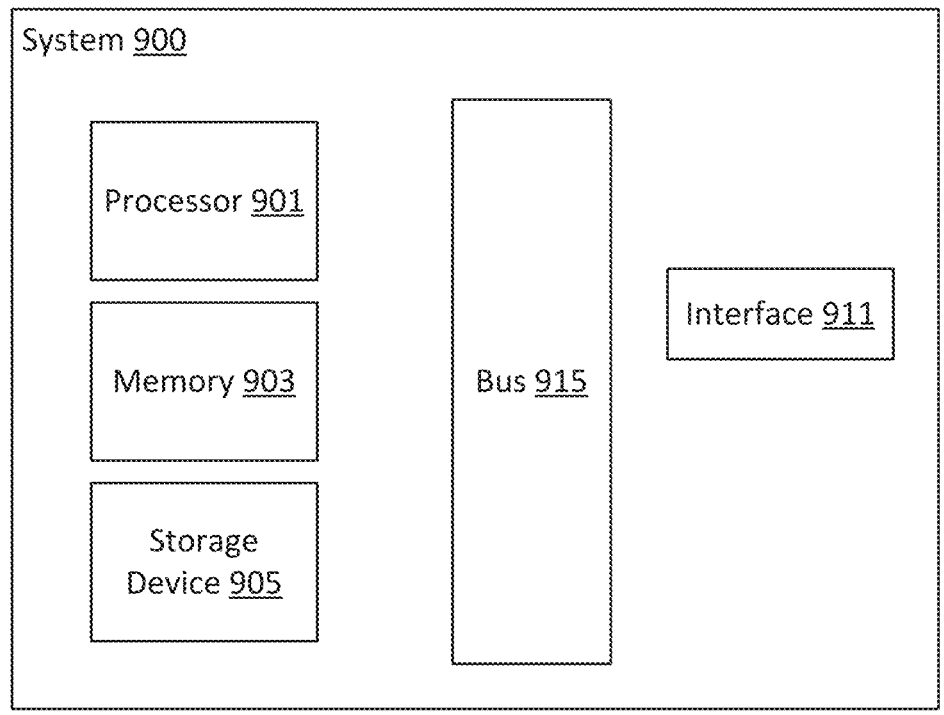
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing platform implemented using a server system, the server system comprising one or more processors configured to cause:
   determining an initial configuration of an application component, the application component being configured to enable interactions with a user, and the initial configuration being retrieved from a cache layer and being determined based on configuration parameters stored in the computing platform;
   including a first instance of the application component in a webpage, the first instance being generated based, at least in part, on the initial configuration;
   receiving, at an interface of the computing platform, a function call from the webpage, the function call being generated based, at least in part, on a user interaction with the webpage;
   based on receiving the function call, dynamically using logic that is defined for the application component to identify at least one change in the configuration parameters associated with the initial configuration based, at least in part, on a type of the user interaction associated with the function call; and
   dynamically implementing a new instance and new deployment data of the application component responsive to the function call to replace the first instance of the application component in the webpage, the new instance being retrieved from the cache layer and comprising the at least one change in the configuration parameters.

2. The computing platform of claim 1, wherein the initial configuration is generated based, at least in part, on a plurality of configuration parameters.

3. The computing platform of claim 2, wherein the new instance is generated responsive to the function call.

4. The computing platform of claim 2, wherein the implementing of the new instance of the application component comprises:
   modifying the initial configuration of the application component responsive to the function call, the modifying being implemented by a web server.

5. The computing platform of claim 4, wherein the modifying of the initial configuration of the application component comprises:
   changing one or more configuration parameters of deployment data for the application component.

6. The computing platform of claim 1 further comprising:
   generating a notification message based, at least in part, on one or more changes to the instance of the application component.

7. The computing platform of claim 1, wherein the application component is a user interface component capable of being displayed in user interface.

8. The computing platform of claim 7, wherein the user interface component is selected from a group consisting of: a button, a text field, and a link.

9. A method comprising:
   determining an initial configuration of an application component, the application component being configured to enable interactions with a user, and the initial configuration being retrieved from a cache layer and being determined based on configuration parameters stored in a computing platform;
   including a first instance of the application component in a webpage, the first instance being generated based, at least in part, on the initial configuration;
   receiving, at an interface of the computing platform, a function call from the webpage, the function call being generated based, at least in part, on a user interaction with the webpage; and
   based on receiving the function call, dynamically using logic that is defined for the application component to identify at least one change in the configuration parameters associated with the initial configuration based, at least in part, on a type of the user interaction associated with the function call; and
   dynamically implementing a new instance and new deployment data of the application component responsive to the function call to replace the first instance of the application component in the webpage, the new instance being retrieved from the cache layer and comprising the at least one change in the configuration parameters.

10. The method of claim 9, wherein the initial configuration is generated based, at least in part, on a plurality of configuration parameters.

11. The method of claim 10, wherein the new instance is generated responsive to the function call.

12. The method of claim 10, wherein the implementing of the new instance of the application component comprises:
   modifying the initial configuration of the application component responsive to the function call, the modifying being implemented by a web server.

13. The method of claim 12, wherein the modifying of the initial configuration of the application component comprises:
   changing one or more configuration parameters of deployment data for the application component.

14. The method of claim 9 further comprising:
   generating a notification message based, at least in part, on one or more changes to the instance of the application component.

15. The method of claim 9, wherein the application component is a user interface component that is selected from a group consisting of: a button, a text field, and a link.

16. A computer program product comprising non-transitory computer-readable program code capable of being executed by one or more processors when retrieved from a non-transitory computer-readable medium, the program code comprising instructions configurable to cause the one or more processors to perform a method comprising:
   determining an initial configuration of an application component, the application component being configured to enable interactions with a user, and the initial configuration being retrieved from a cache layer and being determined based on configuration parameters stored in a computing platform;
   including a first instance of the application component in a webpage, the first instance being generated based, at least in part, on the initial configuration;

receiving, at an interface of the computing platform, a function call from the webpage, the function call being generated based, at least in part, on a user interaction with the webpage; and based on receiving the function call, dynamically using logic that is defined for the application component to identify at least one change in the configuration parameters associated with the initial configuration based, at least in part, on a type of the user interaction associated with the function call; and dynamically implementing a new instance and new deployment data of the application component responsive to the function call to replace the first instance of the application component in the webpage, the new instance being retrieved from the cache layer and comprising the at least one change in the configuration parameters.

17. The computer program product recited in claim 16, wherein the new instance is generated responsive to the function call.

18. The computer program product recited in claim 16, wherein the implementing of the new instance of the application component comprises:

modifying the initial configuration of the application component responsive to the function call, the modifying being implemented by a web server.

* * * * *